United States Patent [19]
Nakamura

[11] Patent Number: 5,940,634
[45] Date of Patent: Aug. 17, 1999

[54] RANGE FINDING DEVICE

[75] Inventor: Kenji Nakamura, Kasai, Japan

[73] Assignee: Minolta Co., Ltd., Osaka, Japan

[21] Appl. No.: 08/979,550

[22] Filed: Nov. 26, 1997

[30] Foreign Application Priority Data

Nov. 27, 1996 [JP] Japan .................................... 8-316356

[51] Int. Cl.$^6$ ................................................. G03B 13/36
[52] U.S. Cl. .......................... 396/104; 396/128; 396/147
[58] Field of Search ................................... 396/104, 128, 396/147; 250/201.8; 356/3.14

[56] References Cited

U.S. PATENT DOCUMENTS 4,762,987  8/1988  Ishida et al. ........................ 250/201.8
5,202,555  4/1993  Ishida et al. ........................ 250/201.8
5,202,718  4/1993  Uchiyama ................................ 396/104
5,561,497  10/1996 Muramatsu et al. ................ 396/128 X Primary Examiner—W. B. Perkey
Attorney, Agent, or Firm—Burns, Doane, Swecker & Mathis, LLP

[57] ABSTRACT

Minimum value calculator 125 detects the minimum value of a correlation value series, and waveform analyzer 126 analyzes the waveform of the correlation value series in the close shift range which exceeds the measurable range of the AF controllable range. A proximity warning is issued when the position of the minimum value is in the close shift range, or when there is monotonic decrease of the correlation value series in the close shift range. The waveform analyzer 126 also detects when a minimum value position is in an immeasurable range exceeding the close shift range, and accurately issues a proximity warning.

16 Claims, 9 Drawing Sheets

RANGE FINDING DEVICE

BACKGROUND OF THE INVENTION

1. Field of the Invention

The present invention relates to a range finding device of the so-called passive external light type which detects the distance to an object using an object image obtained by receiving the reflected external light (peripheral light) from the object.

2. Description of the Related Art

Fixed lens cameras such as compact cameras and so-called lens shutter cameras and the like are provided with a range finder of the so-called passive external light type which comprises, adjacent to a view finder optical system, a pair of line sensors, and a distance objective lens to form on the line sensors an object image included within the range frame provided within the view finder.

The ranging principle of the aforesaid range finder is the detection of the amount of relative positional dislocation of an image sensed by one line sensor relative to an image sensed by the other line sensor, and calculating the object distance using the amount of dislocation.

FIG. 10 illustrates the ranging principle of a conventional range finder of the passive external light type.

Within range finder 20 are provided an autofocus (AF) sensor comprising a pair of charge-coupled device (CCD) line sensors 21 and 22 to photoelectrically convert a sensed object image to electric signals, and lenses 23 and 24 to form the object image on the CCD line sensors 21 and 22. The number of pixels M of the image sensing range of CCD line sensor 22 are a predetermined number r in excess of the number of pixels N of the image sensing range of CCD line sensor 21.

CCD line sensors 21 and 22 are arranged a predetermined distance XO on the same line.

When a partial image having the same number of pixels as the number of pixels N comprising an image GL sensed by the CCD line sensor 21 is extracted from the image GR having M pixels sensed by CCD line sensor 22 as a second image for use in comparison, a second image GR(i) of (r+1) is obtained (where i=0, 1, . . . r). When the left edge of image GR is used as a reference position, a partial image having N pixels is extracted from each second image GR(i) by shifting i pixels from the reference position toward the right side.

Then, the object distance is calculated by comparing the first image GL and the second image GR(i) of (r+1), calculating a second image GR(i) matching both images, and calculating the amount of dislocation Xd of the second image GR(i) relative to the first image GL. That is, when an object is at an infinity position, range finder 20 makes the adjustment so that first image GL matches the second image GR(0), and the second image GR(i) matching the first image GL is shifted to the right side in accordance with bringing the object nearer from the infinity position. Therefore, when the number k second image GR(k) matches the first image GL and the distance from the reference position at image GR of the second image GR(k) is designated Xi, the amount of shift Xd of the first image GL and second image GR(k) is calculated by the expression (XO+Xi). Since the object distance D0 corresponding to the infinity position is preset, the object distance D0, the object distance Dk is calculated using the distance XO between the first image GL and the second image GR(0), and the amount of shift Xd between the first image GL and the second image GR(k).

The second image GR(k) which matches the first image GL is determined by calculating the correlation value S(i) that expresses the degree of matching of each second image GR(i) relative to a first image GL. As shown in FIG. 11, the correlation value S(i) is defined by the total sum of the absolute value of the level differential of the pixel data g1(j) comprising the first image GL and the pixel data g2(j+k) comprising the second image GR(k) at a position corresponding to the pixel data g1(j) (i.e., the j position) as shown below;

$\Sigma |g2(j+k)-g1(j)|$ when the position of the second image GR(k) is expressed by the shift position from a reference position of the first image GL, the second image GR(k) having a minimum value Sm of a waveform in a correlation series of correlation values S(i) corresponding to the shift position i is calculated as the second image matching the first image GL, as shown in FIG. 12.

The range finder 20 is capable of measuring to a range closer than the closest distance of the object distance range measurable by the autofocus system of the camera (hereinafter referred to as "AF controllable range"); FIG. 12 shows the shift range wl expressing the range of detectable object distances. The close shift range w2 expresses a range corresponding to object distance (near range W in FIG. 1) closer than the aforesaid AF controllable range.

In conventional cameras provided with passive external light type rangefinders, when the minimum value Sm of the waveform correlation series is detected by the close shift range w2, AF control is not possible and a warning hereinafter referred to as "proximity warning") is issued expressing that the object is closer than the AF controllable range by having, for example, the LED display flash to indicate the focus state in AF control. When the minimum value Sm of the waveform correlation series cannot be detected, release prohibited, impaired ranging and like warning displays of predetermined impaired ranging processes are executed.

The aforesaid proximity warning alerts the photographer to the fact that an object is closer than the AF controllable range, and since AF control can be accomplished by setting a suitable object distance, it is desirable that the proximity warning is used as far as possible when the minimum value Sm of the correlation value series is in the close range w2 and outside the close shift range w2.

Conventional rangefinders execute impaired ranging processes without issuing a proximity warning when the minimum value Sm of the correlation value series is outside the close shift range w2 so as to similarly execute impaired ranging processes when the minimum value Sm of the correlation value series cannot be selected within the shift range w1.

SUMMARY OF THE INVENTION

In view of the aforesaid information, the present invention provides a range finder capable of accurate range detection and issuing a proximity warning even when a minimum value of the correlation value series is within the impaired ranging range.

In order to achieve the object, the range finding device is comprising: a pair of sensing devices which senses a pair of images; a correlation value calculator which calculates correlation values expressing a degree of matching of a pair of images at each shift position while shifting the relationship of a pair of image signals; a detector which detects a first distance range wherein an object lens focus adjustment is possible and a second distance range closer than the first distance range based on the correlation values of the shift positions obtained by the correlation value calculator; a determiner which determines whether or not a correlation value of a shift position corresponding to the second distance range is monotonically decreasing; and a focusing determiner which determines that focusing is impossible when monotonic decrease is determined by the determiner.

BRIEF DESCRIPTION OF THE DRAWINGS

These and other objects and features of this invention will become clear from the following description, taken in conjunction with the preferred embodiments with reference to the accompanied drawings in which.

DETAILED DESCRIPTION OF THE PREFERRED EMBODIMENTS

Figure 1:
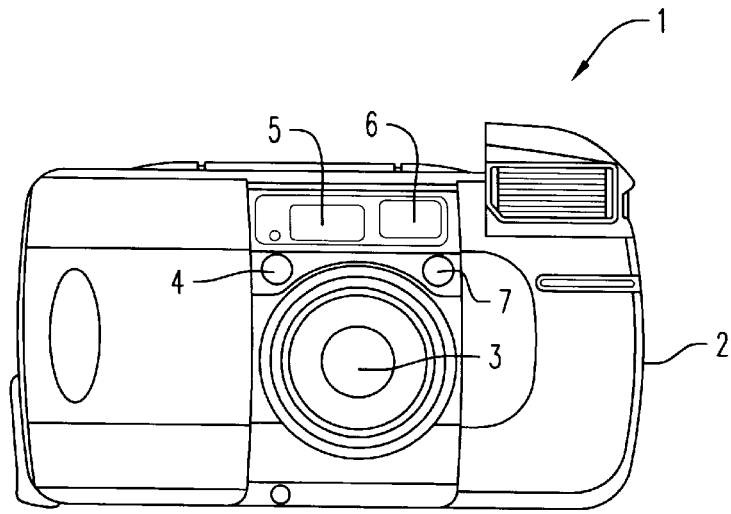
FIG. 1 is a front view of a camera provided with an embodiment of the range finder of the present invention.
Figure 2:
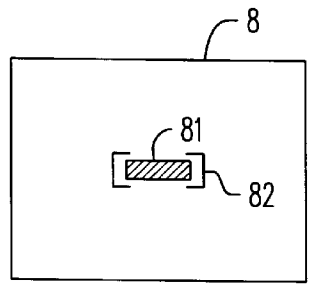
FIG. 2 illustrates the sensitivity range of the AF sensor within the imaging plane.

FIG. 1 is a front view of a camera provided with an embodiment of the range finder of the present invention.

Camera 1 is provided with a photographic lens 3 comprising a zoom lens disposed in the center of the front surface of camera body 2, and a light meter unit 4 is disposed top left of lens 3. A lens shutter comprising a plurality of shutter shades is provided within the lens system of photographic lens 3. A range finder 5 is provided above photographic lens 3, and a view finder window 6 is provided to the right thereof; an auxiliary light emission window 7 used for rangefinding is disposed below the view finder window 6.

Light meter unit 4 is provided with photoreceptor elements such as SPC or the like, and calculates brightness data of an object by receiving light from the object.

Rangefinder unit 5 is provided with an AF sensor 9 having a sensitivity range 81 in the center of the viewing frame 8 of the view finder, and detects the distance D(m) from camera 1 to an object (hereinafter referred to as "object distance") using image information obtained by receiving the reflected light from the object within sensitivity range 81. An AF frame 82 representing the ranging area is displayed in the center of the viewing frame 8 within the view finder. A photographer frames the object to be focused within the AF frame 82, and adjusts the focus of the object by pressing the shutter button halfway.

Figure 3:
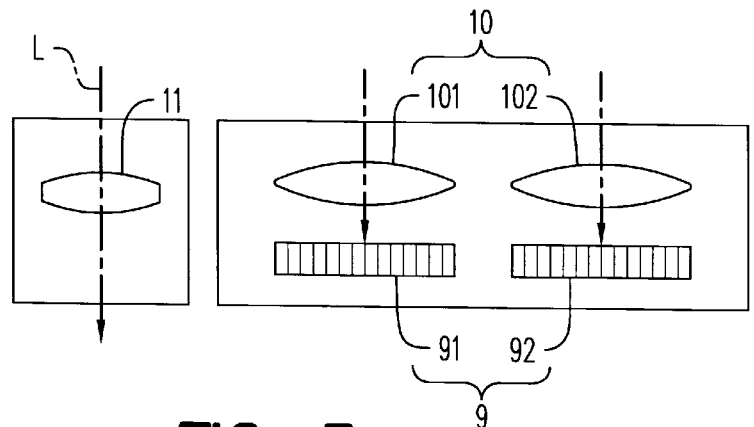
FIG. 3 shows the construction of range finder unit.

Rangefinder unit 5 mainly comprises, as shown in FIG. 3, an autofocus (AF) sensor 9 including a pair of line image sensors 91 and 92, and a lens unit 10 including a pair of small lens arrays 101 and 102 arranged in front of the line image sensors 91 and 92, respectively. Line image sensors 91 and 92 are arranged at a predetermined interval on the same line. Line image sensors 91 and 92 comprise charge-coupled device (CCD) line sensors having, for example, linear arrays of a plurality of charge-coupling elements (hereinafter referred to as "pixels"); range finder unit 5 detects an object distance D using line image sensors 91 and 92 to sense part of an object image and using the derived data of both sensed images (i.e., data output from each pixel; hereinafter referred to as "pixel data").

Object distance D is calculated from the amount of shifting of the relative positions of a linear image obtained in a first image area and a linear image obtained in a second image area when line image sensor 91 on the near side of optical axis L of the view finder optical unit 7 is designated the first image area and line sensor 92 on the far side of the optical axis L is designated the second image area within the line image sensors 91 and 92.

The auxiliary light emission window 7 is a window which emits auxiliary light to measure the object distance toward an object under low lighting conditions, and within the window 7 are photoemitter elements comprising infrared LEDS and the like, as well as a lens to focus the light emitted by the photoemitter elements and project the focused light to the object.

Figure 4:
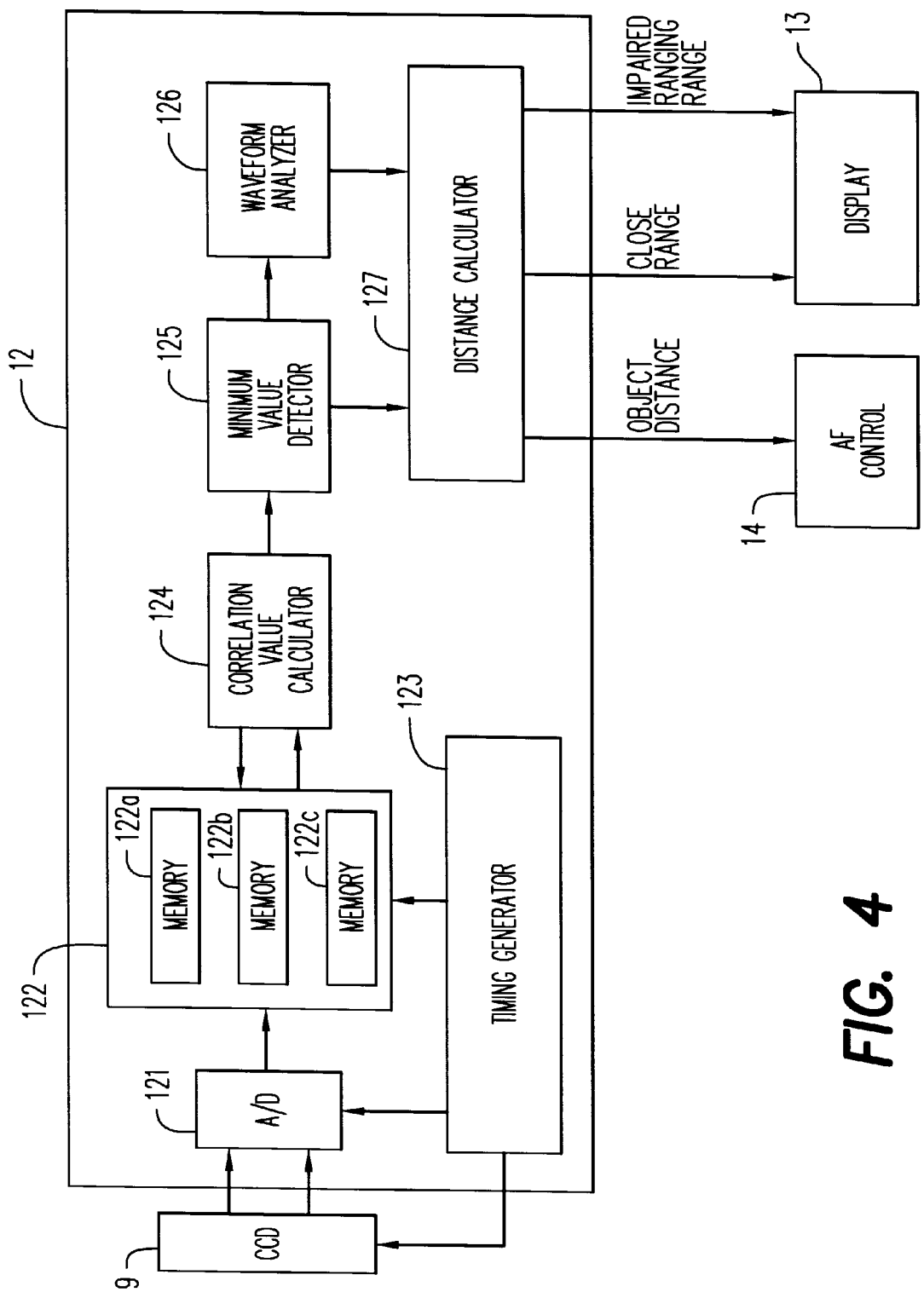
FIG. 4 is a block diagram of the control unit of the range finder of an embodiment of the invention.

FIG. 4 is a block diagram of the control unit of the rangefinder of the present embodiment of the invention.

In FIG. 4, control unit 12 comprises an autofocus mechanism (AF), autoexposure mechanism (AE), and a microcomputer to control continuous photographic operations of camera 1 such as release and the like; control unit 12 also executes rangefinding controls.

Control unit 12 is provided with an analog-to-digital (A/D) converter 121, memory 122, timing generator 123, correlation value calculator 124, minimum value detector 125, waveform analyzer 126, and object distance calculator 127.

A/D converter 121 converts pixel signals output from AF sensor 9 into digital signal (hereinafter referred to as "pixel data"). Memory 122 stores the pixel data received from A/D converter 121, and stores calculation results calculated by correlation value calculator 124. Memory 122 is provided with a first data area 122a, a second data area 122b, and a range data area 122c, such that pixel data comprising a linear image received by line image sensor 91 are stored in the first data area 122a, and pixel data comprising a linear image received by line image sensor 92 are stored in the second data area 122b. The calculation results calculated by correlation value calculator 124 are stored in range data area 122c.

Timing generator 123 generates timing signals to control the sensing of an object by AF sensor 9. Timing generator 123 generates control signals (control signals to control load accumulation time) to control photographic operations, and outputs the control signals to AF sensor 9; timing generator 123 also generates a readout clock to output pixel data from AF sensor 9, and outputs the readout clock to AF sensor 9, A/D converter 121, and memory 122.

Figure 5:
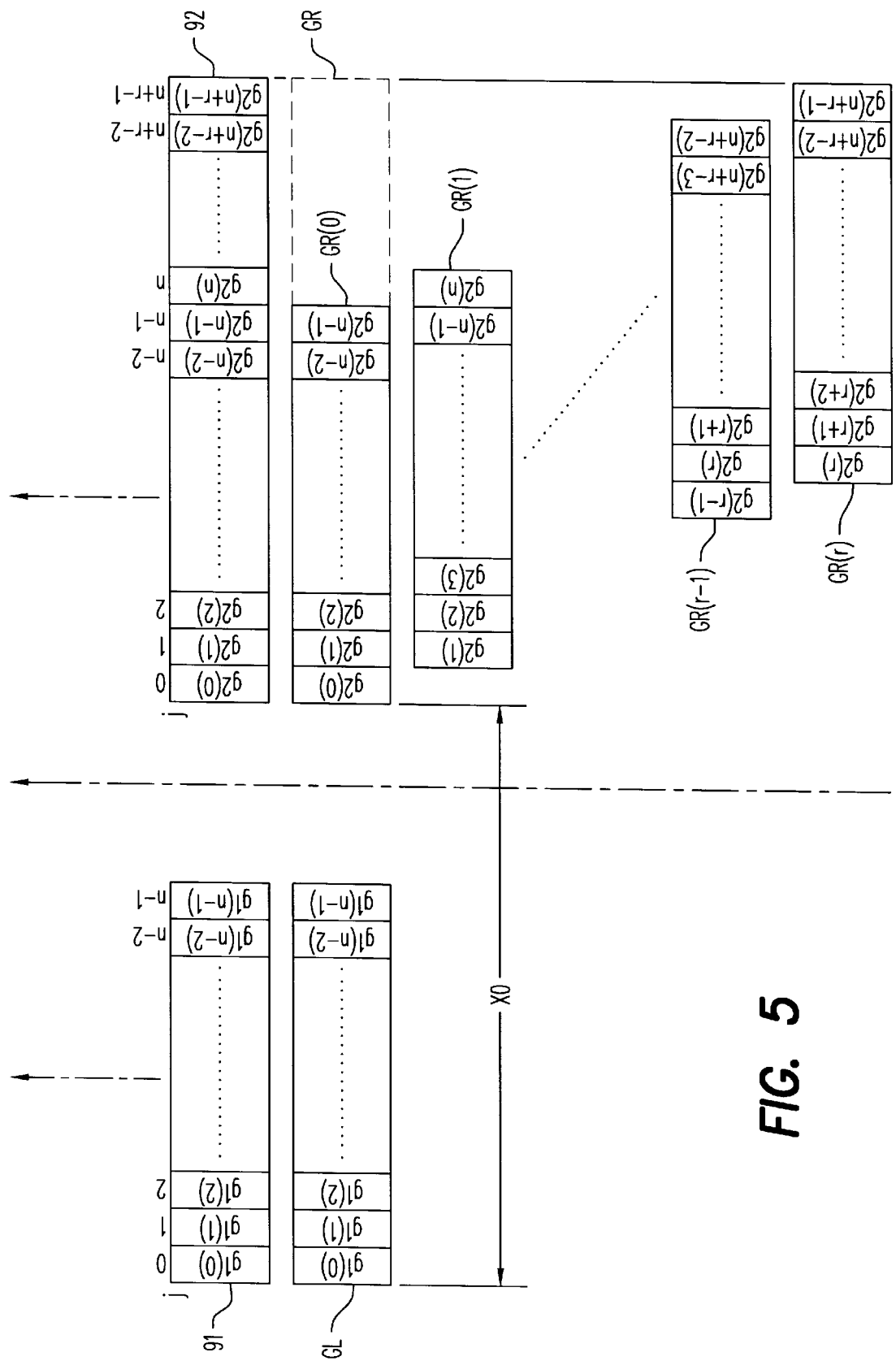
FIG. 5 illustrates the relationship between the reference image and a standard image used to calculate correlation values.

Correlation value calculator 124 calculates the correlation values expressing the degree of matching between a linear image obtained in a first image area (hereinafter referred to as "standard image"), and a plurality of partial linear images of the same number of pixels as the extracted standard image by shifting the pixel position from the linear image obtained in a second image area in a shift direction (hereinafter referred to as "reference image"). That is, as shown in FIG. 5, when pixel data g1(0) to g1(n−1) are included in standard image GL obtained in the first image area, and pixel data g1(0) to g1(n+r−1) are included in linear GR obtained in the second image area, the standard image GL comprises the pixel data g1(0) to g1(n−1). When the left edge position of the linear image GR is set as the standard position and the reference image having the same number of pixels n as the standard image obtained by shifting from the standard position i pixels in a rightward direction is designated GR(i) (where i=0, 1, . . . r), the reference image GR(i) comprises the pixel data g2(i) to g2(i+n).

Pixel data g1(k) represents pixel data at pixel position of pixel k when the pixel positions of standard image GL are named 0, 1, 2 . . . in a rightward direction from the left edge side. Similarly, pixel data g2(k) represents pixel data at pixel position of pixel k when the pixel positions of linear image GR are named 0, 1, 2 . . . in a leftward direction from the right edge side.

Although reference image GR(i) is shifted and extracted at 1 pixel pitch in the present embodiment, the reference image GR(i) may be extracted at 2 pixel pitch or more.

The correlation value S(i) between standard image GL and reference image GR(i) is defined by the total sum of the absolute value of the level differential of the pixel data g1(j) comprising the standard image GL and the pixel data g2(j+k) comprising the reference image GR(i) at a position corresponding to the pixel data g1(j) (i.e., the j position) as shown below;

$$\Sigma |g2(j+1)-g1(j)|$$

(where j=0, 1, . . . n−1); correlation value S(i) expresses the correlation value at shift position i. Correlation value calculator 124 calculates correlation values S(i) between standard image GL and reference image GR(i) at all shift positions, and stores the calculation results in memory 122.

Minimum value detector 125 detects the minimum value Sm of the correlation value series waveform comprising correlation values S(i) for each shift position, and detects the shift position having the minimum value Sm.

Figure 6:
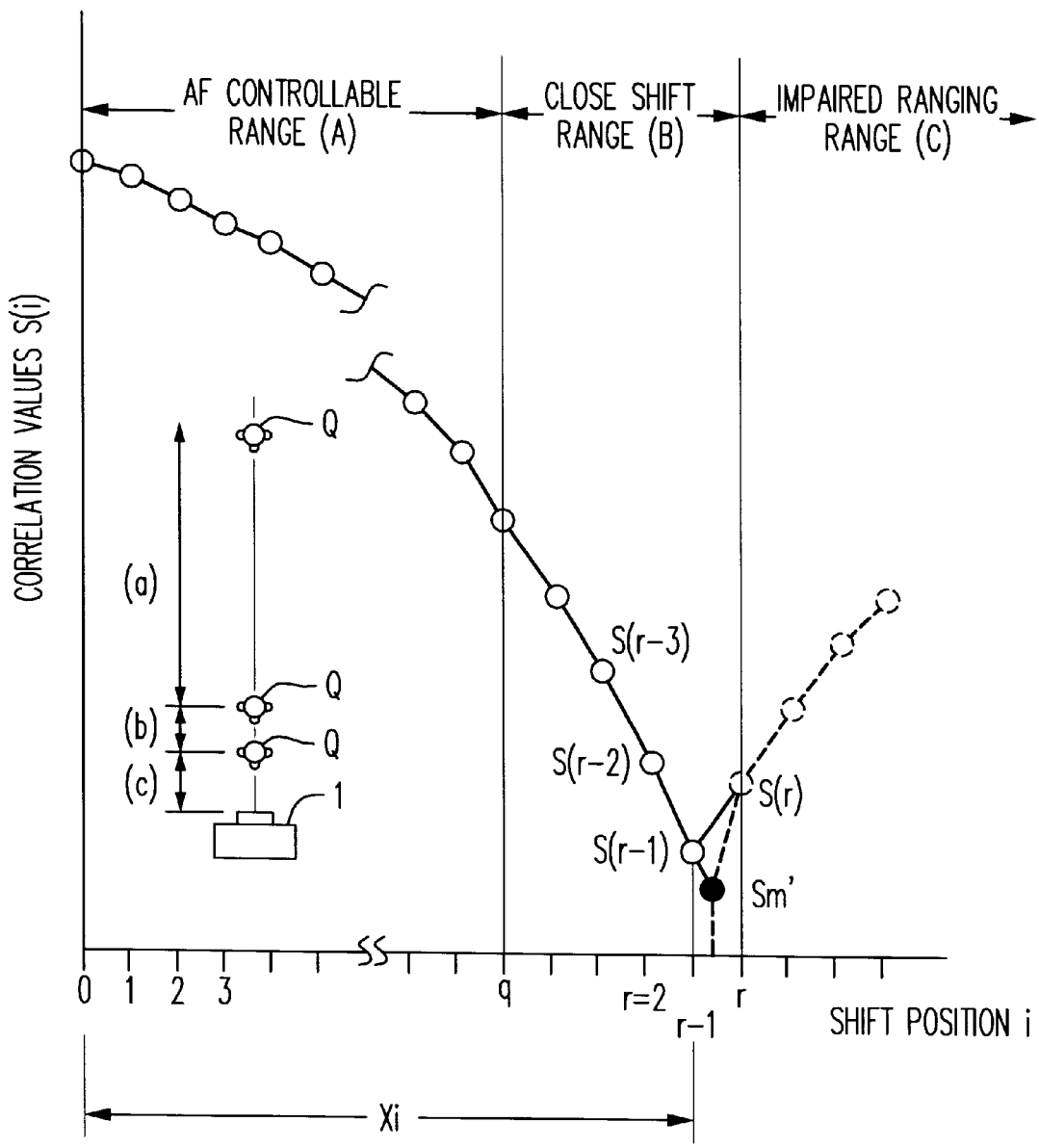
FIG. 6 shows an example of a correlation value series waveform of correlation values S(i) relative to shift number i.

That is, correlation value calculator 124 produces data of correlation value S(i) for i number of shifts as shown in FIG. 6. In FIG. 6, the AF controllable range (A) of the horizontal axis is the range i number of shifts corresponding to the object distance range (a) controllable by the autofocus of camera 1 (hereinafter referred to as "AF control range (a)"), and close shift range (B) is the range of i number of shifts corresponding to a measurable object distance range (b) which is closer than the AF control range (a) (hereinafter referred to as "close range (b)"), and impaired ranging range (C) is a range which cannot be measured because the maximum number of shifts r is exceeded.

Since the number of shift positions i of reference image GR(i) matching a standard image GL increases as object Q comes closer, the close shift range (B) becomes the range r of the maximum number of shifts from a predetermined number of shifts q, and number of shifts q becomes the maximum number of shifts of the AF controllable shift range. The impaired ranging range (C) corresponds to the object distance range which is closer than the close range (b) (hereinafter referred to as "impaired ranging range") because it is outside the close shift range (B).

Minimum value detector 125 discriminates, for example, the code of the amount of change in adjacent correlation value S(i) and S(i+1), and detects a number of shifts i as the shift position of minimum value Sm of the waveform of the correlation value series if S(i−1)−S(i)<0, i.e., when S(i)−S(i+1)>0. In the example of FIG. 6, since S(r−1)−S(r−2)<0. i.e., S(r)−S(r−1)>0, the correlation value S(r−1) is detected as the minimum value Sm, and the number of shifts (r−1) is detected as the shift position of the minimum value Sm.

Figure 7:
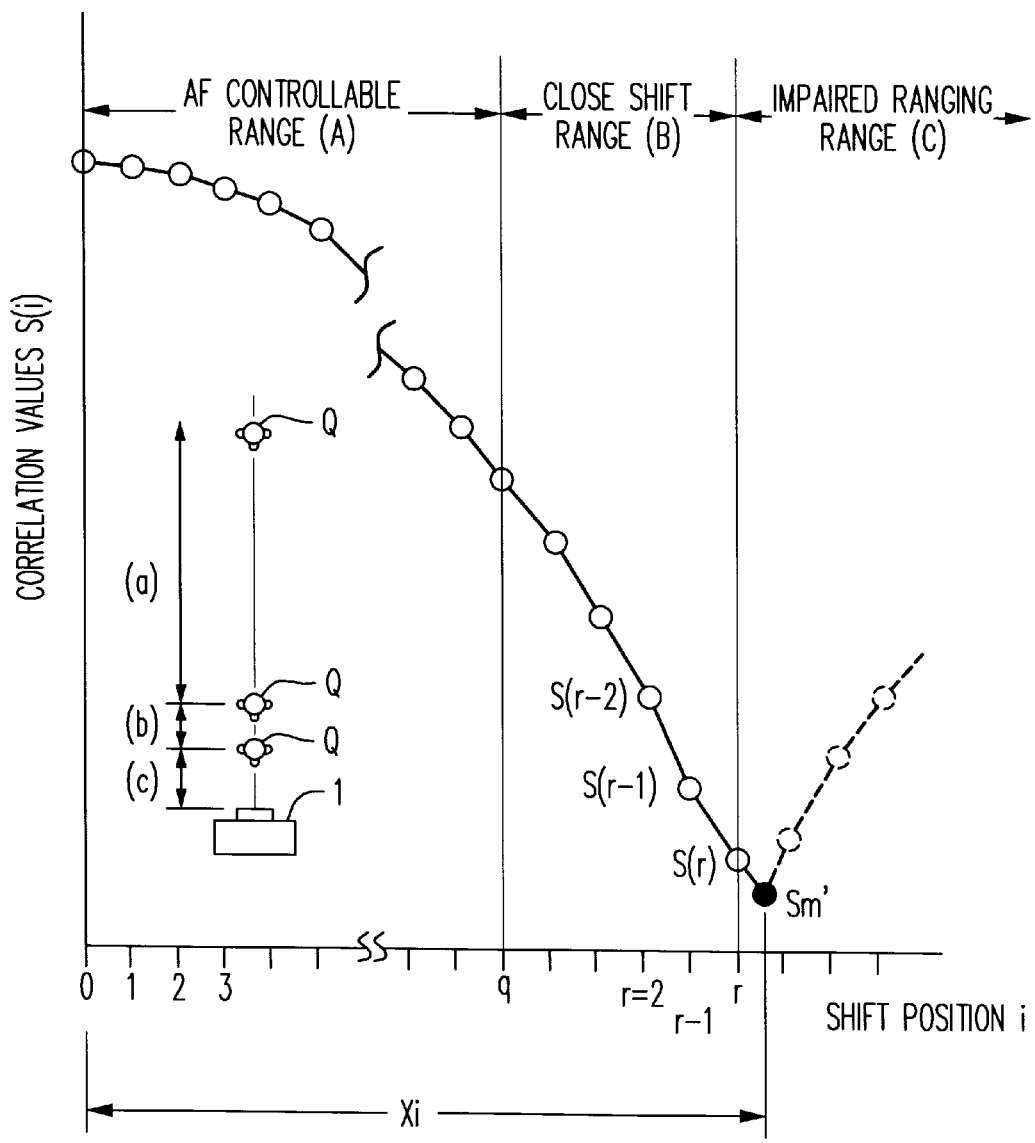
FIG. 7 shows another example of a correlation value series waveform of correlation values S(i) relative to shift number i.

Waveform analyzer 126 analyzes the waveform of the correlation value series in close shift range (B), and discriminates whether or not the object is in the close range (b) and the impaired ranging range (c). When the minimum value Sm of the waveform of the correlation value series is detected, the object is determined to be in the close range (b) via the discrimination result when minimum value Sm is detected within the close shift range (B) via the presence of a reference image GR(i) or GR(i+Δi) matching the standard image GL at the shift i position or an adjacent position relative to the minimum value Sm (where Δi is less than pixel pitch Px; refer to Sm' position in FIG. 6). As shown in FIG. 7, however, when a minimum value Sm is not detected in the close shift range (B) and is presumed to be the impaired ranging range (C), an object cannot be detected in the close range (b) or impaired ranging range (c) by the minimum value Sm detection method.

Waveform analyzer 126 analyzes the waveform of the correlation value series in close shift range (B), and detects an object in close range (b) or impaired ranging range (c) by detecting a monotonic decrease of the waveform. That is, waveform analyzer 126 discriminates and detects a monotonic decrease of the waveform of the correlation value series if at least the change between correlation values S(r−2), S(r−1), and S(r) in close shift range (B) is such that S(r−2)−S(r−1)<0 and S(2−1)−S(r)<0 based on the discrimination result of the code of the amount of change in two adjacent correlation values S(i) and S(i+1) by minimum value detector 125.

Normally, an interpolation calculation is executed to increase the precision of the correlation value calculation. In the correlation value calculation, since the reference image GR(i) of the second image area is shifted in 1 pixel pitch relative to a standard image GL of a first image area to calculate correlation values S(0) to S(r) expressing the degree of matching of both images, when the minimum value Sm' of the waveform of the correlation value series occurs between the pixel pitch, an error difference occurs between the shift amount Xi of the reference image GR(i) and the standard image GL calculated form the minimum value Sm' and the shift amount Xi' of the reference image GR(i+Δi) and the standard image GL calculated from the minimum value Sm'. Interpolation calculation interpolates an accurate shift position (i+Δi) relative to a minimum value Sm' using at least four consecutive correlation values S(i), S(i+1), S(i−1), S(i−2) including the shift position having a minimum value Sm.

When the interpolation calculation is executed and a minimum value Sm occurs near the maximum shift number r, monotonic decrease of the waveform of the correlation value series cannot be detected by the change between correlation values S(r−2), S(r−1), S(r), and since interpolation cannot be accomplished, neither can the shift number of minimum value Sm be calculated.

As shown in FIG. 6, for example, when minimum value Sm' is between shift number (r−1) and the maximum shift number r, monotonic decrease of the waveform of the correlation value series cannot be determined because S(r−2)−S(r−1)<0 and S(r−1)−S(r)>0 when discriminating the change between correlation values S(r−2), S(r−1), and S(r). On the other hand, when executing the interpolation calculation, at least two correlation values are required before and after the minimum value Sm' to be determined; in the example of FIG. 6, correlation values S(r−2), S(r−1), S(r), and S(r+1) are required, but since correlation value S(r+1) corresponding to shift number (r+1) does not exist, the minimum value Sm' cannot be calculated by interpolation.

In order to avoid this problem when calculating an object distance with high precision via an interpolation calculation, monotonic decrease of the waveform of the correlation value series may be detected by excluding the correlation value S(r) and detecting the change between at least correlation values S(r−3), S(r−2), S(r−1) in close shift range (B). That is, if S(r−3)−S(r−2)<0 and S(r−2)−S(r−1)<0, a monotonic decrease is determined in the waveform of the correlation value series.

Object distance calculator 127 calculates information relating to the object distance using the analysis results of waveform analyzer 126 and the detection results of minimum value detector 125. When object distance calculator 127 detects a minimum value Sm in the AF controllable range (A), interpolation calculation is accomplished using a minimum value Sm and a plurality of correlation values adjacent to the minimum value Sm, and the object distance D is calculated based on the shift position relative to the minimum value Sm' calculated by the interpolation calculation. The information of the object distance D is output to the AF control circuit 14.

When object distance calculator 127 detects a minimum value Sm in the close shift range (B), or when a monotonic decrease is determined in the waveform of the correlation value series in close shift range (B), this information is output to, for example, a display 13 within the viewfinder, and a warning display (hereinafter referred to as "proximity warning") is executed alerting to the fact that the position of the object is in close range (b) or impaired ranging range (c). This warning display may be, for example, a flashing LED display indicating the focus state of the AF control, or the lighting of a special warning LED. The proximity warning may also be an audible warning such as a warning buzzer. When a minimum value Sm is not detected and a monotonic decrease of the waveform of the correlation value series is not detected in close shift range (B), information of impaired ranging is output and a warning display is executed in display 13 within the viewfinder and a release prohibition process is executed based on the information.

Figure 8:
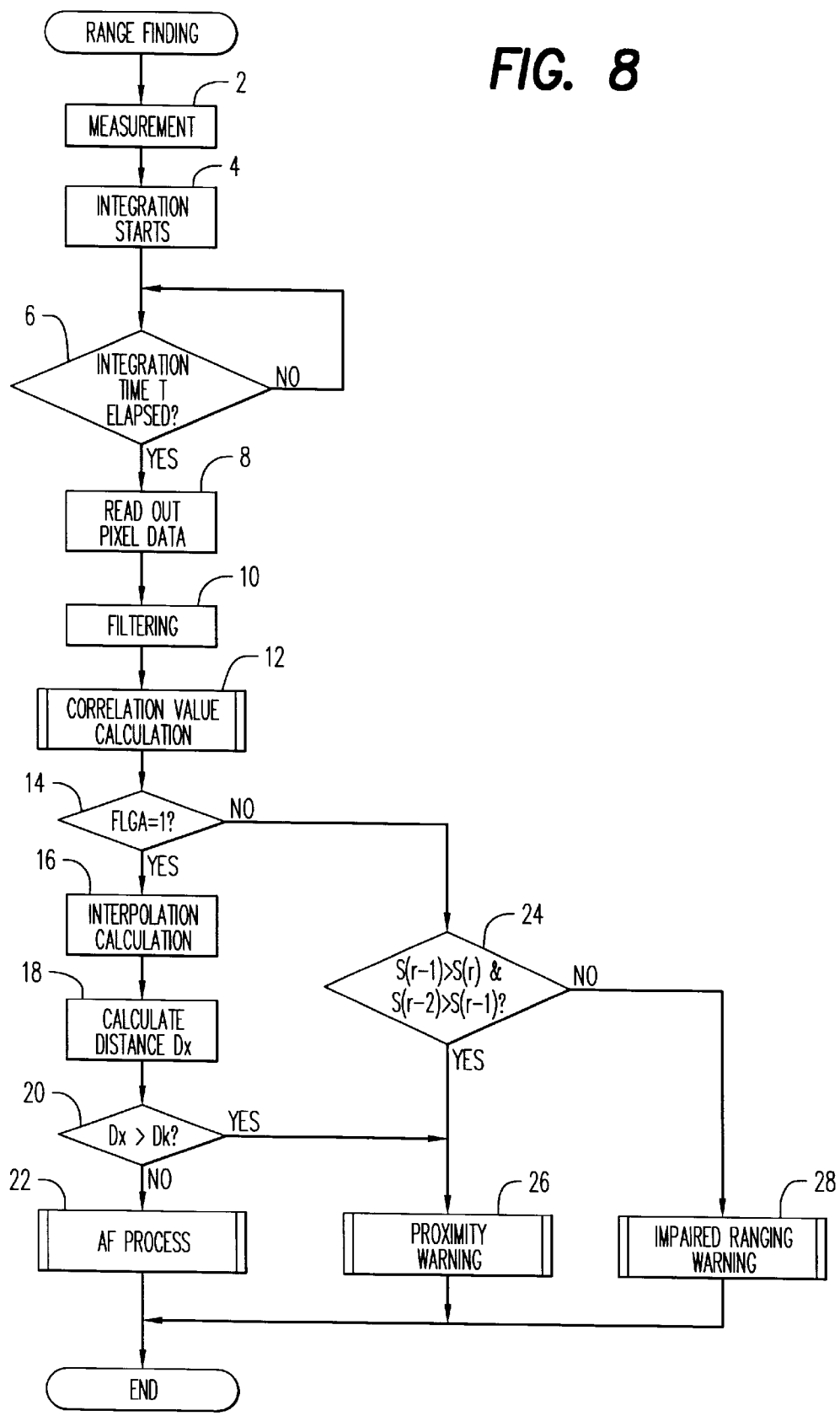
FIG. 8 is a flow chart of the ranging operation of an embodiment of the range finder of the present invention.

The range finding operation of the range finder of the present embodiment of the invention is described hereinafter with reference to the flow chart of FIG. 8.

First, object brightness is detected by light meter 4 (#2). Then, the integration operation (i.e., photoreception operation) of the line image sensors 91 and 92 is started (#4). The maximum value of integration time T of line image sensors 91 and 92 is preset from the allowed rangefinding process time as photography preparation. The actual line image sensor 91 and 92 integration time T changes in accordance with the amount of incidence light, such that the integration operation ends when the amount of light received within the maximum value of the integration time attains a predetermined value (i.e., a signal level necessary for the rangefinding operation).

Figure 9:
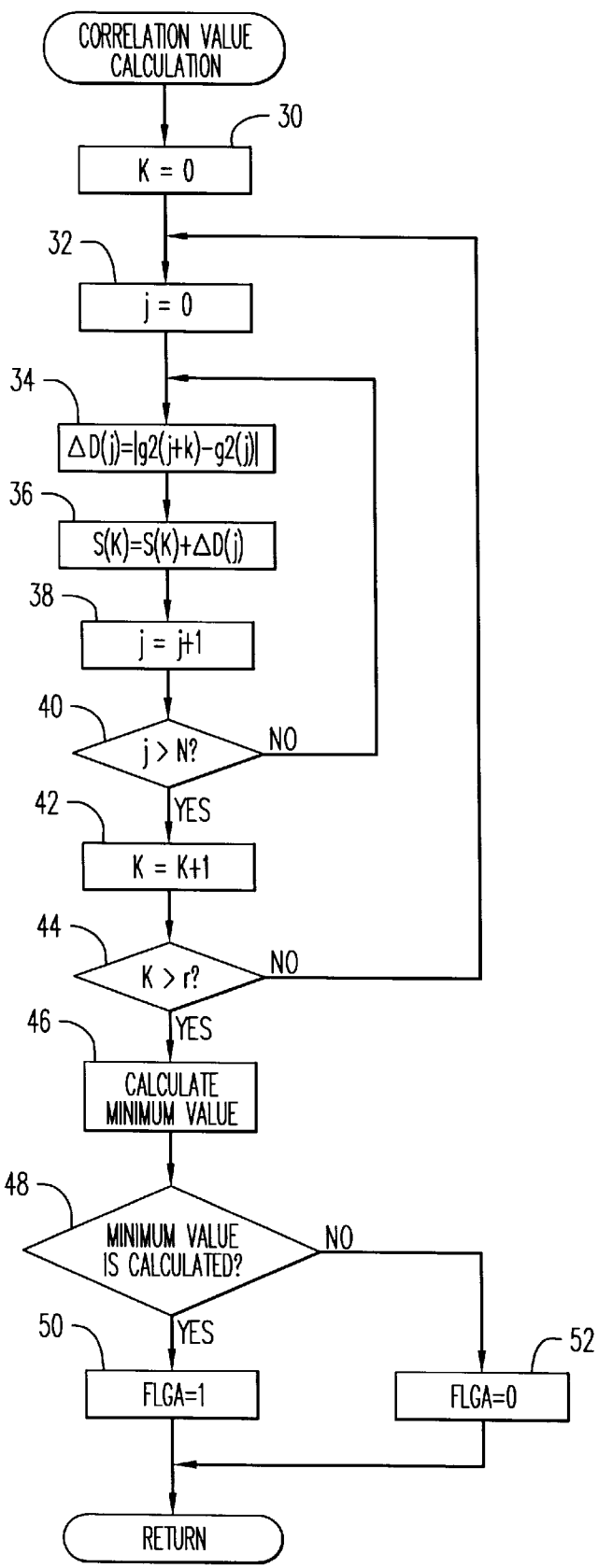
FIG. 9 is a flow chart of the correlation value calculation subroutine.
Figure 10:
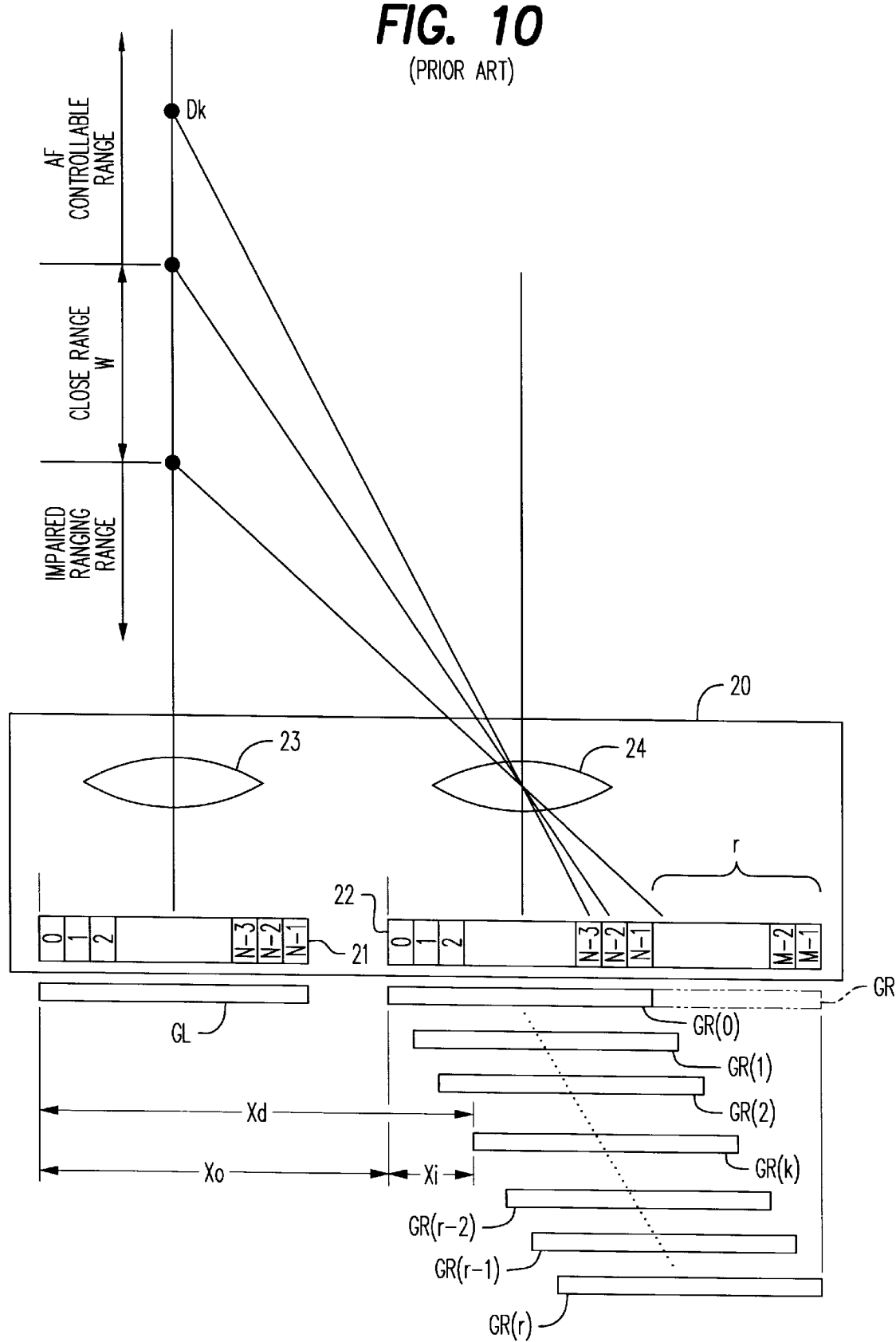
FIG. 10 illustrates the ranging principle of conventional passive external light type rangefinders.
Figure 11:
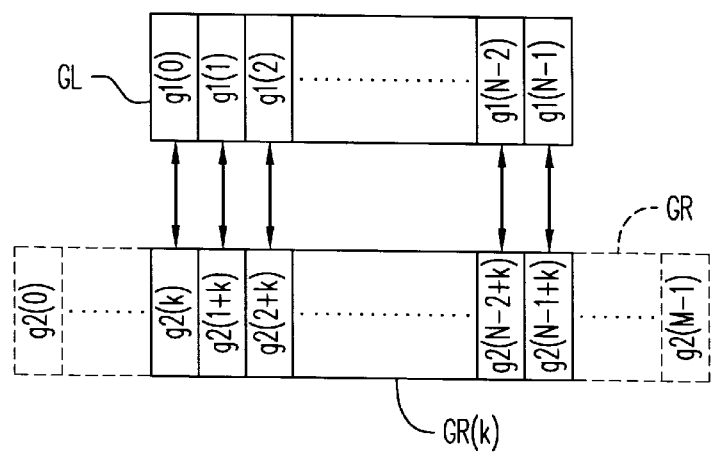
FIG. 11 shows the relationship between mutual pixel data of a first image GL and a second image GR(k) used to calculate correlation value S(k)
Figure 12:
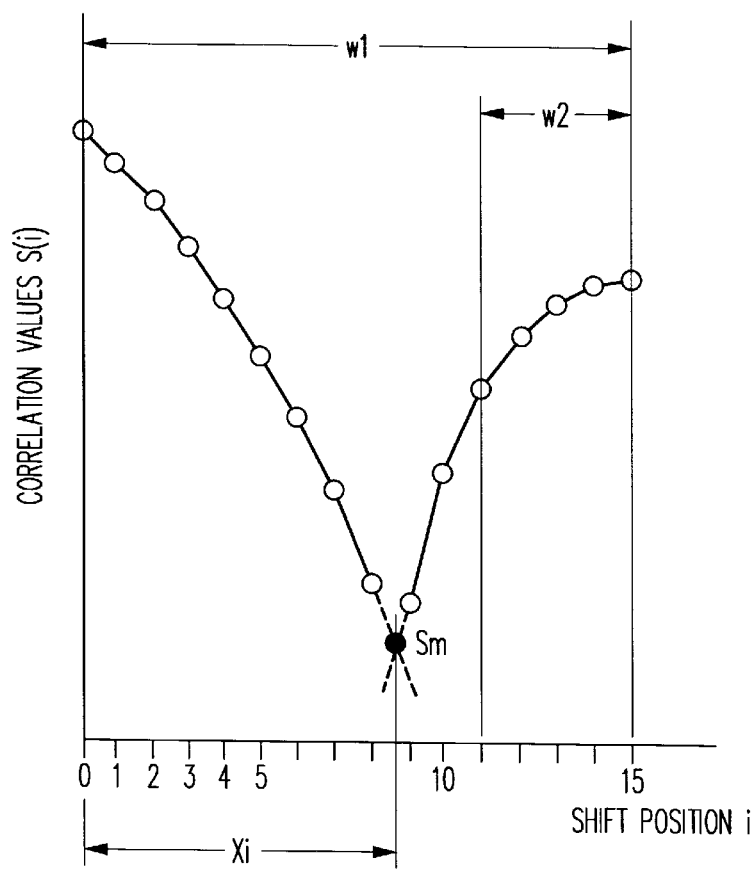
FIG. 12 shows an example of a waveform of correlation values relative to the number of shifts.

After a predetermine integration time T has elapsed (#6: YES), the pixel data of line sensors 91 and 92 are read out (#8). The readout pixel data are subjected to differential conversion, centering conversion and like filtering processes (#10), and subsequently subjected to a correlation calculation in accordance with the correlation value calculation subroutine shown in FIG. 9 (#12). The differential conversion converts the readout pixel data to differential data, for example, between pixel data of a plurality of separated pixels. That is, when the number k pixel data are designated g(k) (where k=1, 2, . . . n) and the discrete pixel number is designated s, pixel data g(k) are converted by the filtering process to differential data Δg(k)=g(k)−g(k+s). The centering conversion converts the position of the differential data Δg(k). That is, the position of Δg(k) is set, for example, as data representing pixel position (k+s)/2. This filtering process reduces the detection error based on the difference in sensitivity between the line image sensors 91 and 92.

When the correlation value calculation subroutine is executed, first the value of counter K which counts the number of shifts is set at [0] (#30). Then, the value of counter j which counts the number of the pixel position is set at [0] (#32), and a correlation value S(0) of reference image GR(0) and standard image GL at shift number K=0 is calculated by the loop process of steps #34 to #40 via the equations below.

$$S(K) = \Delta D(0) + \Delta D(1) + \ldots \Delta D(n-1) \quad (1)$$

$$\Delta D(j) = |g2(j+k) - g1(j)| \quad (2)$$

Equation 2 calculates the level of difference ΔD(j) between pixel data g1(j) comprising standard image GL at pixel position j and the pixel data g2(j+K) comprising reference image GR(K) at shift position K, and equation 1 calculates the total sum of level differences ΔD(j) at all pixel positions j.

When the calculation ends for the correlation value S(0) of reference image GR(0) and standard image GL at shift number K=0(#40: YES), the count value K is incremented (#42), and a check is made to determined whether or not this count value K has exceeded a maximum shift number r (#44). If K≦r (#44: NO), the routine returns to step #34, and a similar calculation is executed to calculate correlation value S(1) of reference image GR(1) and standard image GL at shift number K=1.

The same method is used to calculate the correlation values S(2), S93), . . . S(r) of reference image GR(K) and standard image GL at shift numbers K=2, 3, . . . r (#32 to #44loop), and when the calculation ends for correlation value S(r) of reference image GR(r) and standard image GL at shift number K=r (#44: YES), then, the minimum value calculation is executed to determine the minimum value Sm via the previously described method relative to the correlation value series of correlation value S(K) at shift number K (#46).

Next, a check is made to determine whether or not the minimum value Sm has been calculated (#48). If the minimum value Sm has been calculated (#48: YES), flag FLGA is set at [1] (#50), whereas if the minimum value Sm has not been calculated (#48: NO), the flag FLGA is reset at [0] (#52) and the routine returns. The flag FLGA is a flag expressing the calculation of minimum value Sm, i.e., an object position in AF controllable range (a) or close range (b).

Returning now to FIG., 8, when the correlation value calculation ends, a check is made to determined wither or not the flag FLGA is set at [1] (#14). If the flag FLGA is set at [1] (14: YES), an interpolation calculation is executed based on the result of the correlation calculation (#16). Then, the shift amount Xd is calculated for reference image GR(i+Δi) and standard image GL from the shift position corresponding to more accurate calculated minimum value Sm' via interpolation, and the object distance Dx is calculated using the distance X0 between reference image GR(0) and standard image GL and the object distance D0 corresponding to the infinity position and the shift amount Xd (#18).

Next, a check is made to determine whether or not the calculated object distance Dx exceeds the closest distance Dk preset for AF control (#20). If Dx≦Dk (#20: NO), the object distance Dx is output to AF control circuit 14, and the AF process (autofocus adjustment process) is executed (#22). On the other hand, if Dx>Dk (#20: YES), the object is determined to be in the close range (b), and a warning is displayed on display 13 within the view finder (#26).

If the flag FLGA is reset to [0] in step #14(#14: NO), a check is made to determine whether or not there is a monotonic decrease of the waveform of the correlation value series in the close shift range (B) using a correlation value S(r−1) corresponding to a shift number (r−1) immediately prior to the maximum shift number r and the consecutive correlation values S(r−2), S(r−3) adjacent thereto. That is, a check is made to determine whether or not S(r−2)>S(r−1) and S(r−3)>S(r−2) (#24) If S(r−2)>S(r−1) and S(r−3)>S(r−2) (#24: YES), the previously mentioned proximity warning is executed (#26), whereas if S(r−2)>S(r−1) and S(r−3)>S(r−2) does not obtain (#24: NO), the previously mentioned impaired ranging warning is executed (#28).

In the aforesaid step #24, correlation values S(r), S(r−1), S(r−2) may be substituted for the aforesaid correlation values S(r−1), S(r−2), S(r−3), to determine whether or not a monotonic decrease of the waveform of the correlation value series occurs in the close shift range (B) by determining whether or not S(r−1)>S(r) and S(r−2)>S(r−1).

Although the present embodiment has been described in terms of calculating correlation value S(i) at each shift position by shifting a reference image GR(i) of a second image area relative to a standard image GL of a first image area, it is to be noted that the present invention is applicable to the calculation of correlation value S(i) at each shift position by mutually shifting both the reference image GR and the standard image GL.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

Obviously, many modifications and variation of the present invention are possible in light of the above teachings. It is therefore to be understood that within the scope of the appended claims, the invention may be practiced other than as specifically described.

What is claimed is:

1. A range finding device, comprising:
a pair of sensing devices which senses a pair of images;
a correlation value calculator which calculates correlation values expressing a degree of matching of a pair of images at each shift position while shifting the relationship of a pair of image signals;
a detector which detects a first distance range wherein an object lens focus adjustment is possible and a second distance range closer than said first distance range based on the correlation values of the shift positions obtained by said correlation value calculator;
a determiner which determines whether or not a correlation value of a shift position corresponding to said second distance range is monotonically decreasing; and
a focusing determiner which determines that focusing is impossible when monotonic decrease is determined by said determiner.

2. A range finding device as claimed in claim 1,
further comprising a minimum value detector which detects a minimum value from among correlation values obtained by said correlation value calculator,
wherein said focusing determiner determines that focusing is impossible when said minimum value is detected at a shift position corresponding to said second distance range by said minimum value detector.

3. A range finding device as claimed in claim 2,
further comprising a range finding determiner which determines whether or not range finding is possible,
wherein said range finding determiner determines that range finding is impossible when said minimum value is not detected at a shift position corresponding to said second distance range by said minimum value detector and monotonic decrease of correlation values is not determined by said determiner.

4. A range finding device as claimed in claim 1,
wherein said determiner executes a determination based on plural correlation values at least including a correlation value at a shift position that is immediately prior to a maximum shift position.

5. A range finding device as claimed in claim 1,
further comprising a display device which displays that a distance to an object is too close to said range finding device.

6. A range finding device as claimed in claim 1,
further comprising a range finding determiner which determines whether or not range finding is possible,
wherein said range finding determiner determines that range finding is impossible when monotonic decrease of correlation values corresponding to said second distance range is not determined by said determiner.

7. A range finding device, comprising:
a pair of sensing devices which senses a pair of images;
a correlation value calculator which calculates correlation values expressing a degree of matching of a pair of images at each shift position while shifting the relationship of a pair of image signals;
a detector which detects a first distance range in which an object lens focus adjustment is possible and a second distance range closer than said first distance range based on the correlation values obtained by said correlation value calculator;
a determiner which determines whether or not a distance to an object is in a distance range corresponding to said second distance range; and
a focusing determiner which determines that focusing is impossible when said determiner determines that said distance to an object is in said second distance range.

8. A range finding device as claimed in claim 7,
further comprising a display device which displays that a distance to an object is out of said first distance range when said focusing determiner determines that focusing is impossible.

9. A range finding device as claimed in claim 7,
further comprising a range finding determiner which determines whether or not range finding is possible, wherein said range finding determiner determines that range finding is impossible when a distance is not detected in both of said first distance range and second distance range.

10. A range finding device as claimed in claim 9, further comprising a display device which displays that a distance to an object is out of said first distance range when said focusing determiner determines that focusing is impossible.

11. A range finding device as claimed in claim 9, further comprising a display device which displays that range finding is impossible when said range finding determiner determines that range finding is impossible.

12. A range finding method for a range finding device, comprising the following steps of:

a correlation value calculating step for calculating correlation values expressing a degree of matching of a pair of images at each shift position while shifting the relationship of a pair of image signals obtained by an image sensor;

a determining step for determining that an object is in a first distance range in which an object lens focus adjustment is possible or is in a second distance range closer than said first distance range based on the correlation values obtained by said correlation value calculating;

a judging step for judging that focusing is impossible when an object is in said second distance range.

13. A range finding method for a range finding device as claimed in claim 12, wherein said determining step determines that an object is in said second distance range when a correlation value of a shift position corresponding to said second distance range is monotonically decreasing.

14. A range finding method for a range finding device as claimed in claim 13, wherein said judging step includes a displaying step for displaying a result judged in said judging step.

15. A range finding method for a range finding device as claimed in claim 12, wherein said judging step includes a displaying step for displaying a result judged in said judging step.

16. A camera having a range finding device, comprising:

a pair of sensing devices which senses a pair of images;

a correlation value calculator which calculates correlation values expressing a degree of matching of a pair of images at each shift position while shifting the relationship of a pair of image signals;

a detector which detects a first distance range wherein an object lens focus adjustment is possible and a second distance range closer than said first distance range based on the correlation values of the shift positions obtained by said correlation value calculator;

a determiner which determines whether or not a correlation value of a shift position corresponding to said second distance range is monotonically decreasing; and a focusing determiner which determines that focusing is impossible when monotonic decrease is determined by said determiner.

* * * * *